United States Patent
Xu et al.

(10) Patent No.: US 11,651,212 B2
(45) Date of Patent: May 16, 2023

(54) SYSTEM AND METHOD FOR GENERATING SCORES FOR PREDICTING PROBABILITIES OF TASK COMPLETION

(71) Applicant: Clari Inc., Sunnyvale, CA (US)

(72) Inventors: Xin Xu, Sunnyvale, CA (US); Venkat Rangan, Sunnyvale, CA (US)

(73) Assignee: CLARI INC., Sunnyvale, CA (US)

(*) Notice: Subject to any disclaimer, the term of this patent is extended or adjusted under 35 U.S.C. 154(b) by 640 days.

(21) Appl. No.: 16/729,097

(22) Filed: Dec. 27, 2019

(65) Prior Publication Data

US 2021/0201128 A1 Jul. 1, 2021

(51) Int. Cl.

| | |
|---|---|
| *G06N 3/00* | (2006.01) |
| *G06F 16/00* | (2019.01) |
| *G06Q 10/00* | (2012.01) |
| *G06Q 30/00* | (2012.01) |
| *G06N 3/08* | (2023.01) |
| *G06F 16/25* | (2019.01) |
| *G06Q 10/0631* | (2023.01) |
| *G06N 3/04* | (2023.01) |
| *G06Q 30/016* | (2023.01) |

(52) U.S. Cl.
CPC ............. *G06N 3/08* (2013.01); *G06F 16/254* (2019.01); *G06N 3/0454* (2013.01); *G06Q 10/06316* (2013.01); *G06Q 30/016* (2013.01)

(58) Field of Classification Search
CPC ........ G06Q 30/00; G06Q 10/00; G06Q 50/00; G06N 3/08; G06N 3/0454; G06F 16/254

USPC ................................ 705/7.11–7.42; 706/21
See application file for complete search history.

(56) References Cited

U.S. PATENT DOCUMENTS

| | | | |
|---|---|---|---|
| 2015/0025931 A1* | 1/2015 | Li ..................... | G06Q 10/0633 |
| | | | 705/7.27 |
| 2018/0197108 A1* | 7/2018 | Fang ................... | G06N 20/00 |
| 2020/0042889 A1* | 2/2020 | Lin .................... | G06Q 30/0283 |
| 2020/0286109 A1* | 9/2020 | Kall ................... | G06Q 30/0204 |
| 2021/0042800 A1* | 2/2021 | Chandra ................ | G06N 3/08 |
| 2021/0103953 A1* | 4/2021 | Iyer ................... | G06Q 30/0255 |
| 2021/0166251 A1* | 6/2021 | Mehmanpazir ......... | G06N 20/20 |

* cited by examiner

*Primary Examiner* — Mustafa Iqbal
(74) *Attorney, Agent, or Firm* — Womble Bond Dickinson (US) LLP (57) ABSTRACT

According to various embodiments, described herein are systems and methods for training machine learning (ML) models to generate real-time scores to predict the probabilities of task completion. In one embodiment, an exemplary method includes the operations of receiving, from a data store, a set of features and a workflow for training a first type of ML models, the workflow specifying a data source, a number of stages and associated parameters for training the ML models; retrieving, from the data source, training data for the set of features; and segmenting the training data into different segments. The method further includes the operations of training a separate first type of ML model using each of the different segment of the training data in accordance with the workflow; and persisting the first type of trained ML models into the data storage. The method also includes using a trained ML model to generate probability scores and displaying the scores to users in real-time.

18 Claims, 8 Drawing Sheets

SYSTEM AND METHOD FOR GENERATING SCORES FOR PREDICTING PROBABILITIES OF TASK COMPLETION

TECHNICAL FIELD

Embodiments of the present invention relate generally to machine learning. More particularly, embodiments of the invention relate to training machine learning models for use in generating scores to predict the probabilities of task completion.

BACKGROUND

Users of a task database, such as a customer relationship management (CRM) system, may have access to a variety of information related to a particular task stored in the task database. An example of such a task database can be a sales opportunity in the CRM system, which can track data for all events related to the sales opportunity. However, based on the tracked data, a user of the task database may not be able to predict the likelihood of the completion of the task. In the example of the CRM system, a salesperson may have a hard time to determine intuitively whether a particular sales opportunity can be closed or not based on the tracked data.

For many organizations, it can be important to predict the likelihood that a task can be closed or not. Such prediction can be useful for forecasting sales revenues for the organizations; and for identifying opportunities that are at risks, so that appropriate actions can be taken to salvage the opportunities.

BRIEF DESCRIPTION OF THE DRAWINGS

Embodiments of the invention are illustrated by way of example and not limited to the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" or "in an embodiment" in various places in the specification do not necessarily all refer to the same embodiment.

According to various embodiments, described herein are systems and methods for training machine learning (ML) models to generate real-time scores to predict the probabilities of task completion. According to an exemplary method, a set of features and a workflow for training a first type of ML models are received from a data store. The workflow species a data source, a number of stages, and parameters associated with the stages. Training data for the set of features is retrieved from the data source, and then segmented into different segments. The method further includes the operations of training a separate first type of ML model using each of the different segments of the training data in accordance with the workflow; and persisting the first type of trained ML models into the data storage.

In one embodiment, both the workflow and the set of features are configurable via a user interface. A deep learning container, such as a Python container, can be used to train and reference the ML models. The workflow includes one or more of the following stages: a preprocessing stage, a segmentation stage, a downsampling stage, a feature selection stage, and a training stage, and a reference stage. The ML models that have been trained using the workflow and the set of features can include Random Forest, Xgboost, long short-term memory (LSTM), and feedforward neural networks.

In one embodiment, Random Forest is a model made up of multiple decision trees. Rather than just simply averaging the prediction of trees (also referred to as a "forest"), Random Forest model uses two key concepts: random sampling of training data points when building trees, and random subsets of features considered when splitting nodes. XGBoost is a decision-tree-based ensemble Machine Learning algorithm that uses a gradient boosting framework. With a regular machine learning model, like a decision tree, a single model on a dataset is trained and used for prediction. Boosting, on the other hand, takes a more iterative approach. Rather than training all of the models in isolation of one another, boosting trains models in succession, with each new model being trained to correct the errors made by the previous ones. Models are added sequentially until no further improvements can be made. Long short-term memory (LSTM) is an artificial recurrent neural network (RNN) architecture used in the field of deep learning. Unlike standard feedforward neural networks, LSTM has feedback connections. It can not only process single data points (such as images), but also entire sequences of data (such as speech or video). For example, LSTM is applicable to tasks such as unsegmented, connected handwriting recognition speech recognition. A common LSTM unit is composed of a cell, an input gate, an output gate and a forget gate. The cell remembers values over arbitrary time intervals and the three gates regulate the flow of information into and out of the cell. Deep Feedforward networks or also known multilayer perceptrons are the foundation of deep learning models. These networks are represented by a composition of many different functions. Each model is associated with an acyclic graph describing how the functions are composed together. For example, we might have three functions f(1), f(2), and f(3) connected in a chain, to form f(x)=f(3)(f(2)(f(1)(x))). In this f(1) is the first layer, f(2) is the second layer and f(3) is the output layer. The layers between the input layer and output layers are known as hidden layers, as the training data does not show the desired output for these layers. A network can contain any number of hidden layers with any number of hidden units. A unit basically resembles a neuron which takes input from units of previous layers and computes its own activation value.

In one embodiment, for each type of ML model, a different ML model can be trained for each segment of the training data, which is retrieved from a data mart to the deep learning container in a streaming fashion.

According to another embodiment, an exemplary method of generating scores to predict probabilities of task completion includes the operations of receiving a request for scoring a task, the request including a current status of the task; determining one of many pre-determined segments that the task belongs to; retrieving, from a cloud storage service, a corresponding ML model that has been trained using training data for the segment that the task belongs to. The method further includes the operations of generating, by the corresponding ML model, a probability score indicating the likelihood that the task is to be closed; and identifying one or more factors that account for a predetermined portion of the probability score.

In one embodiment, the operation of generating the probability score further includes: determining, from a configuration data structure stored in a cloud storage service, a first set of features used to train the ML model; determining a current status of the task; and providing the first set of features and the current status to the ML model for generating the probability score.

In one embodiment, when the configuration structure has been modified, and the modified configuration data structure includes a second set of features that is larger than the first set of features used to train the ML model, the second set of features can be reduced to the first set of features by removing one or more features from the second set of features before the second set of features can be provided to the ML model.

According to another embodiment, a scoring system can predict the probability that a task can be closed or not based on historical data and the current status of the task. The scoring system is highly configurable and can incorporate data from a variety of data sources, and can easily be extended to other machine learning tasks by changing a number of modules/configuration in the scoring system. The scoring system can use real-time data from a task database system, and therefore can provide accurate, timely prediction results to users. An explanation for each prediction score can be generated to help users identify reasons for high/low scores, so that the users can take immediate actions accordingly. Feature importance information for all tasks can be collected and provided to users to help them understand fields that are deterministic.

Embodiments of the invention provide users with intuitive information to help them understand if a task is healthy enough to be won, and understand the deterministic reasons for winning or losing the task.

Figure 1:
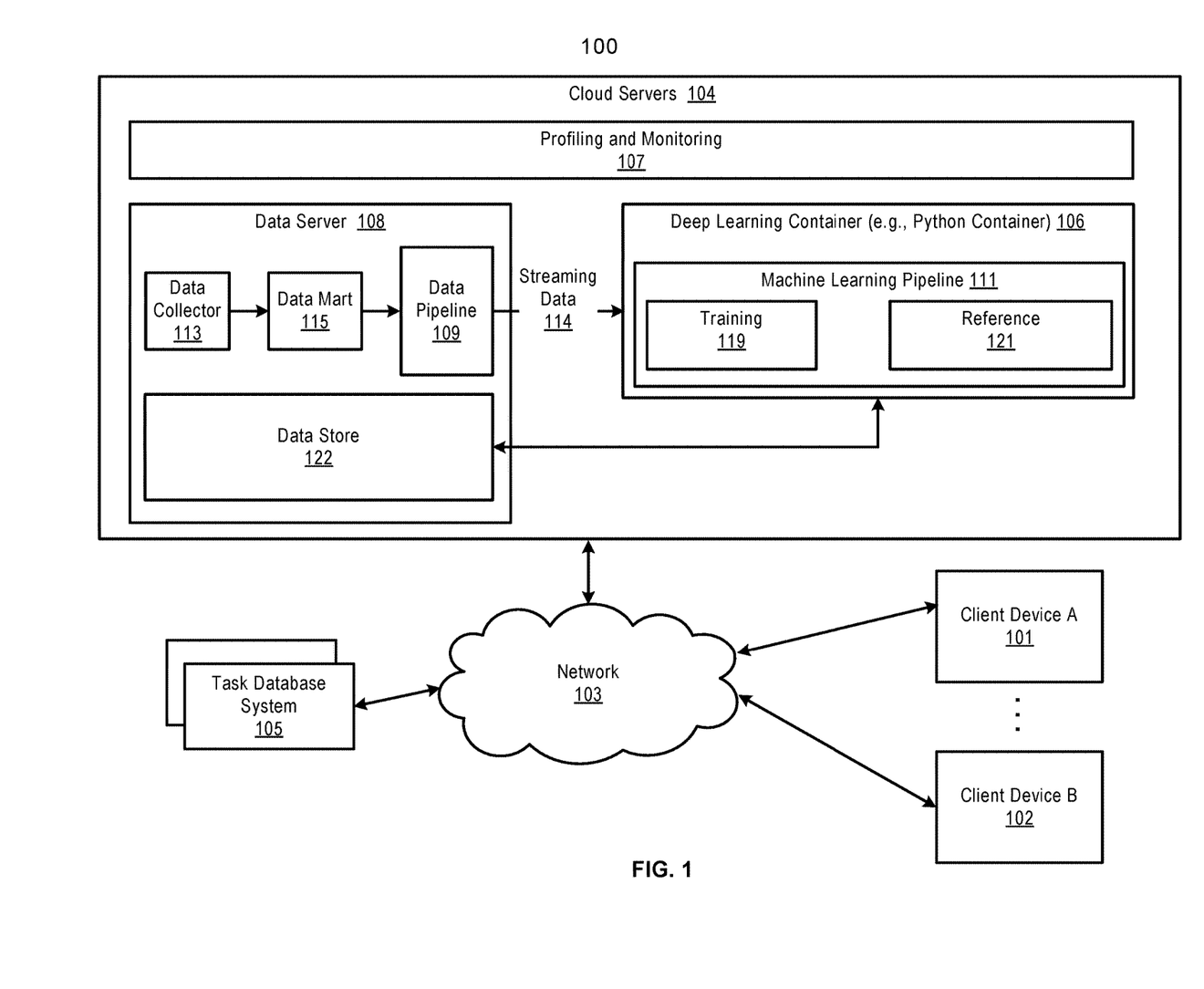
FIG. 1 is a block diagram illustrating an example system of training a machine learning model for predicting probabilities of task completion in accordance with an embodiment.

FIG. 1 is a block diagram illustrating an example system 100 of training a machine learning model for predicting probabilities of task completion in accordance with an embodiment. As shown in FIG. 1, the system 100 can include one or more clients 101-102 communicatively coupled to a number of cloud servers 104 and a task database system 105 over network 103. The cloud servers 104 can further include a data server 108, and a deep learning container 106.

Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless.

In one embodiment, the task database system 105 can be a customer relationship management (CRM) system that store historical data and/or raw opportunity. The task database system 105 provides task data services and data to a variety of clients, which may be periodically or constantly accessed and updated by the clients for managing their task management data.

The data server 108 can be any kinds of servers, for example, a Web server, an application server, a backend server, etc. The data server 108 can include a data collector 113, a data mart 115, and a data pipeline 109. The data collector 113 can connect to the task database system 105 using a variety of communication protocols, and can be periodically updated from the task database system 105 or another data source or data provider. The data server 108 can perform Extract, Transform and Load (ETL) operations, and save the preprocessed data into the data mart 115, which represents a view of data retrieved from the task database system 105.

Based on configurations, the data collector 113 can retrieve different types of data from a number of data sources. The data collector 113 can retrieve task data (e.g., CRM data), activities data, account data, or any data that is needed for training ML model.

In one embodiment, a task can represent a deal, an opportunity, or a project in the task database system 105. A task needs to go through a number of predefined stages in the task database system to be considered completed or won or closed.

For example, a sales opportunity is an example of a task, which may need to progress through the stages of "new", "pipeline", "upside/best case", "commit", and "closed". These stages are used as an example of a sales opportunity; a different set of stages can be defined for a sales opportunity or another type of task in the task database system 105. Activities data represents activities of a user assigned to complete a task, and can include emails exchanged between the user of the task and one or more contacts (outside parties) associated with the task; and past meetings and scheduled meetings between the user and the one or more contacts.

The data pipeline 109 can retrieve corresponding data from the data mart 115 with appropriate granularity, organize the data into appropriate formats, and send the organized data through representational state transfer (REST) application programming interfaces (API) in a streaming fashion. The data pipeline 109 can send streaming data 114 using different signals to a machine pipeline 111 executed in the deep learning container 106 for the purpose of model training 119 and model reference 121.

The deep learning container 106 can be a Python container, which can execute a workflow that defines a number of phases for training a machine learning model. The Python container can be a Docker container, where a trained machine learning model can be provided as a micro-service via an API to users.

A data store 122 in the data server 108 can store an overall workflow defining stages for training ML models, and features that are to be used in training the ML models. The features and the workflow can be configured via one or more user interfaces in a client device.

In one embodiment, during the training phase 119, a number of predetermined machine learning models can be trained using the streaming data 114 from the data mart 115. During the reference phrase 121, a particular trained machine model can be selected to generate a score in response to receiving a new task to be scored. The value of the prediction score indicates the likelihood that the task can be closed.

The machine learning pipeline 111 can also generate a number of factors for explaining the prediction score. In one embodiment, the selected trained machine model can be iteratively executed to generate multiple prediction scores; and for each iteration, a feature is removed. The feature whose removal results in a biggest score change can be selected as one of the top explanatory factors.

In one embodiment, the example system 100 includes a profiling and monitoring module 107, which keeps track of training time for an ML model, the number of records/opportunities that the ML model has been trained on, the time it takes to generate a prediction score, and information for indicating the accuracy of the prediction score.

Figure 2:
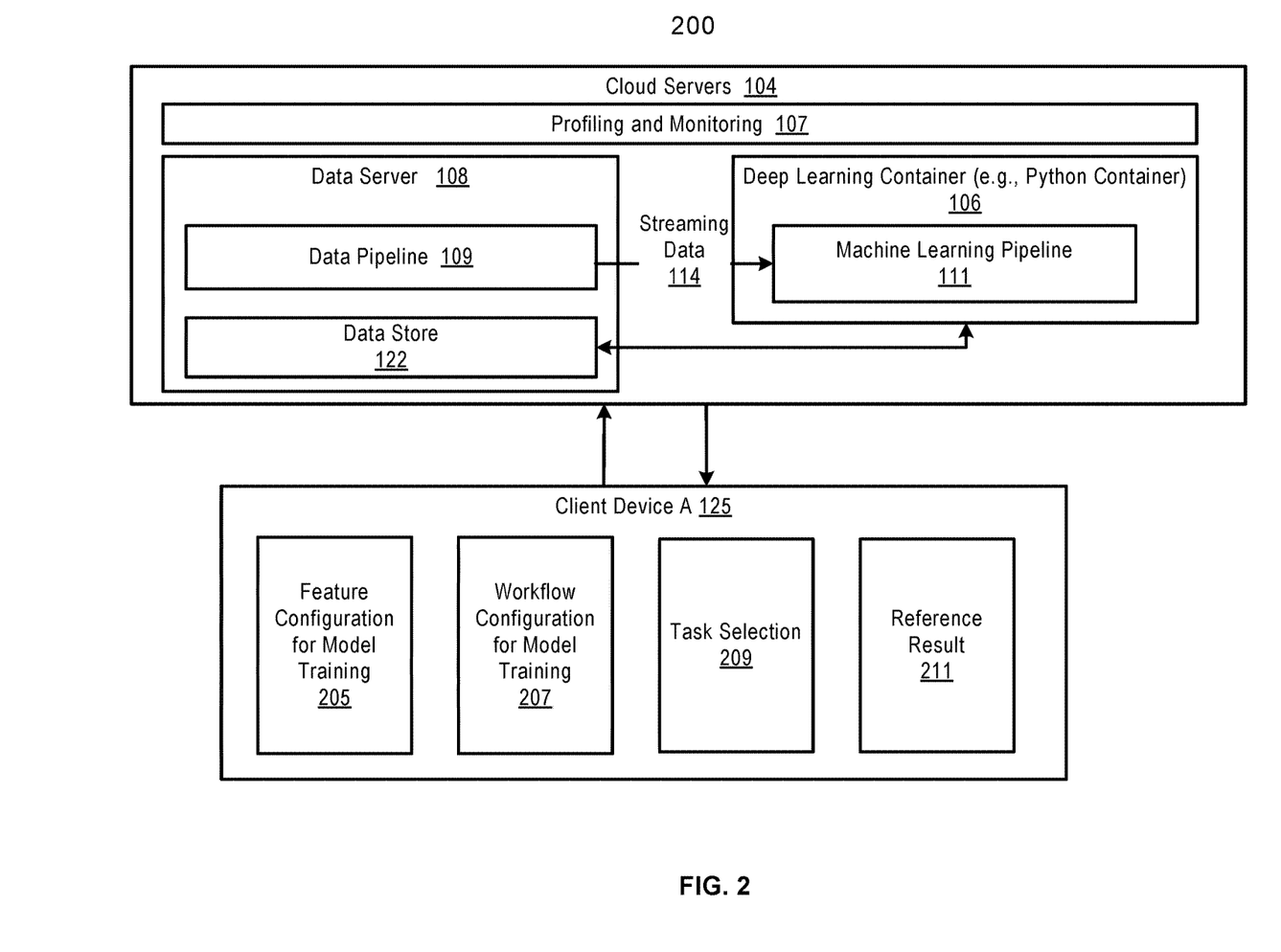
FIG. 2 is a block diagram illustrating an example system of training a machine learning model for predicting probabilities of task completion in accordance with an embodiment.

FIG. 2 is a block diagram illustrating an example system 200 of training a machine learning model for predicting probabilities of task completion in accordance with an embodiment. More specifically, FIG. 2 illustrates a number of user interfaces for a user to interact with the cloud servers 104.

As shown in FIG. 2, a user interface 205 can be used to configure features for ML model training. A feature as used in this disclosure can be a field or attribute in the streaming task data 114 retrieved from the task database system 105. The user interface 205 enables a user to select, deselect, add or delete a feature; and to select a data source from which to retrieve the streaming data 114.

A user interface 207 enables a user to configure a workflow for training ML models. In one embodiment, an ML workflow can be a template for training ML models, and can define an ML pipeline (e.g., the ML pipeline 111) that performs an ordered sequence of steps, with each step a discrete processing action. Examples of the discrete steps include obtaining data, preparing the data, training a ML model and interpreting the results. Each step can be implemented as a separate module. The separate modules can be concatenated into a pipeline using programming languages such as Python.

In one embodiment, a user may add new modules and their corresponding module parameters, or delete existing modules from the workflow via the user interface 207.

The user-edited workflow and features for training ML models can be persisted into the data store 122, and can be retrieved by the deep learning container 106, which can execute a machine learning pipeline (e.g., the ML pipeline 111) defined by the user-edited workflow to train ML models.

As further shown in FIG. 2, a task selection 209 and a reference result interface 211 are also available via client device A 125, for a user to select a new task and invoke a trained ML model to generate a score indicating the likelihood of completion of the task. The reference result interface 211 may also display one or more factors that best explain the value of the score.

Figure 3:
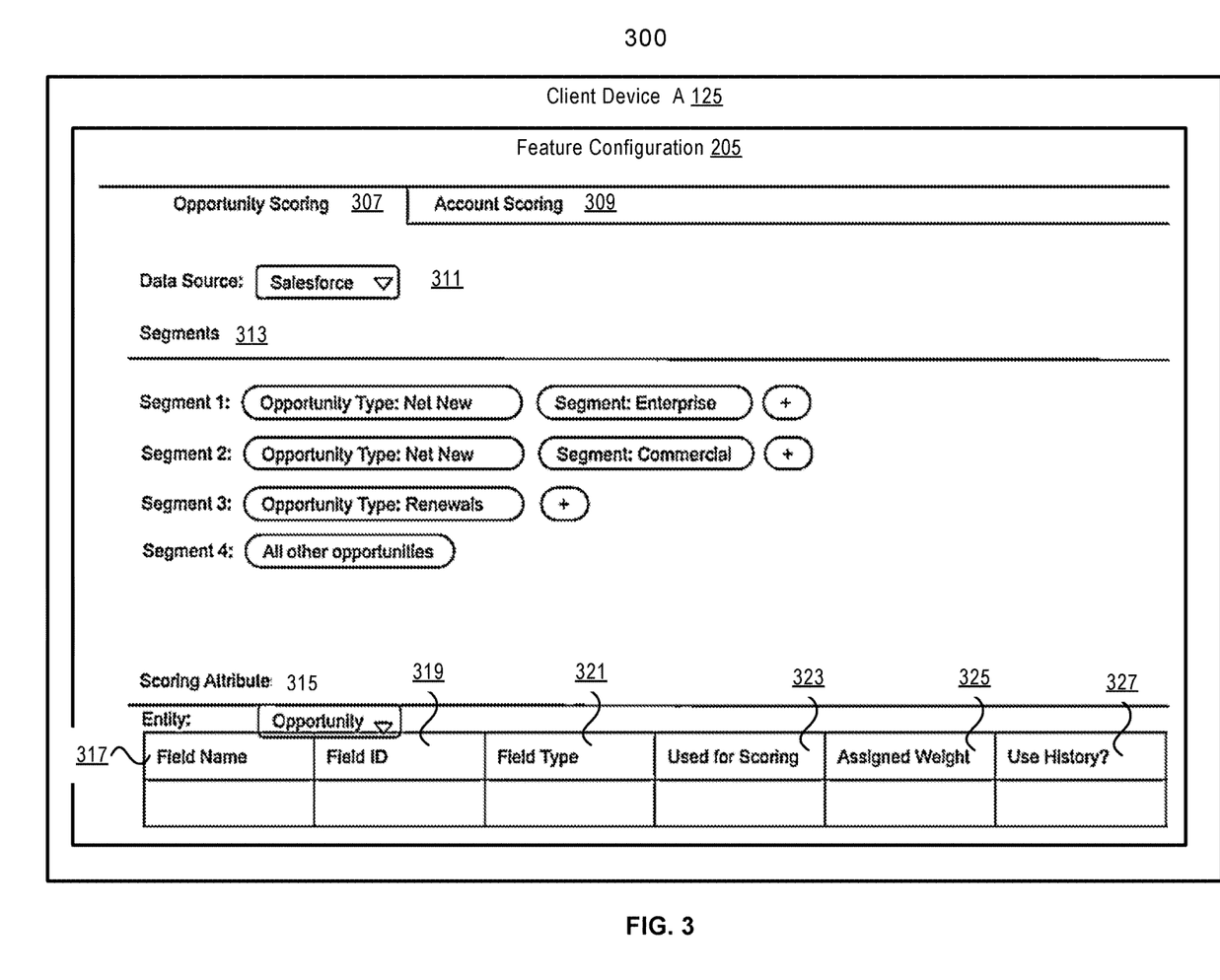
FIG. 3 illustrates an example user interface for feature configuration in accordance with an embodiment.

FIG. 3 illustrates an example user interface 300 for feature configuration in accordance with an embodiment. As shown in FIG. 3, the user interface 205 includes a number of options, for example, opportunity score 307 and account scoring 309, that allow a user to obtain a probability score on a task/opportunity or an account. A dropdown list 311 is provided for the user to select a data source.

In one embodiment, a "segments" section 313 lists a number of segments, and allows a user to add additional segments. Tasks in a same category may show a similar pattern. For example, enterprise tasks may share one pattern in terms of the likelihood of being closed, while commercial tasks may show another pattern in terms of the likelihood of being closed. Grouping tasks into different segments and training different ML models using corresponding groups of data would result in ML models with better prediction performance.

The user interface 205 includes a number of default features 315 (i.e., attributes or fields). A user can uncheck and/or add additional features via the user interface 205. Each field/attribute can have a field name 317, a field ID 319, and a field type 321; and can be associated with a number options, including whether the field can be used for scoring 323, whether the field has been assigned a weight 325, and whether historical data is to be used for the field 327.

In one embodiment, the user-configured fields can be stored in a Mongo collection. MongoDB, as used in this disclosure, refers to a cross-platform document-oriented database program. Classified as a NoSQL database program, MongoDB uses JSON-like documents with schema. The Mongo collection can be a data structure that stores the fields and associated data and/or other data captured from the feature configuration user interface 205. The Mongo collection can be constantly updated according to the crawl-status of an organization, activity data, and user/account data. One or more artificial fields (i.e. derived fields), such as the duration of fields or change of fields, can be created. When a user selects or deselects a field, fields derived from that field need to be selected or deselected. For example, if the user deselects the field of "stage", the field of "change of stage" that is derived from the field of "stage" needs to be grayed out.

In one embodiment, there can be a number of events that trigger the updates to the Mongo collection. The Mongo collection can be configured to be refreshed at a fixed time period, for example, twice a week. The Mongo collection can also be updated when the user selects or deselects some fields and clicks "submit". In one embodiment, when the user selects or selects the fields and clicks "submit", a trained ML model needs to be rebuilt from scratch, rather than being refined incrementally.

Figure 4:
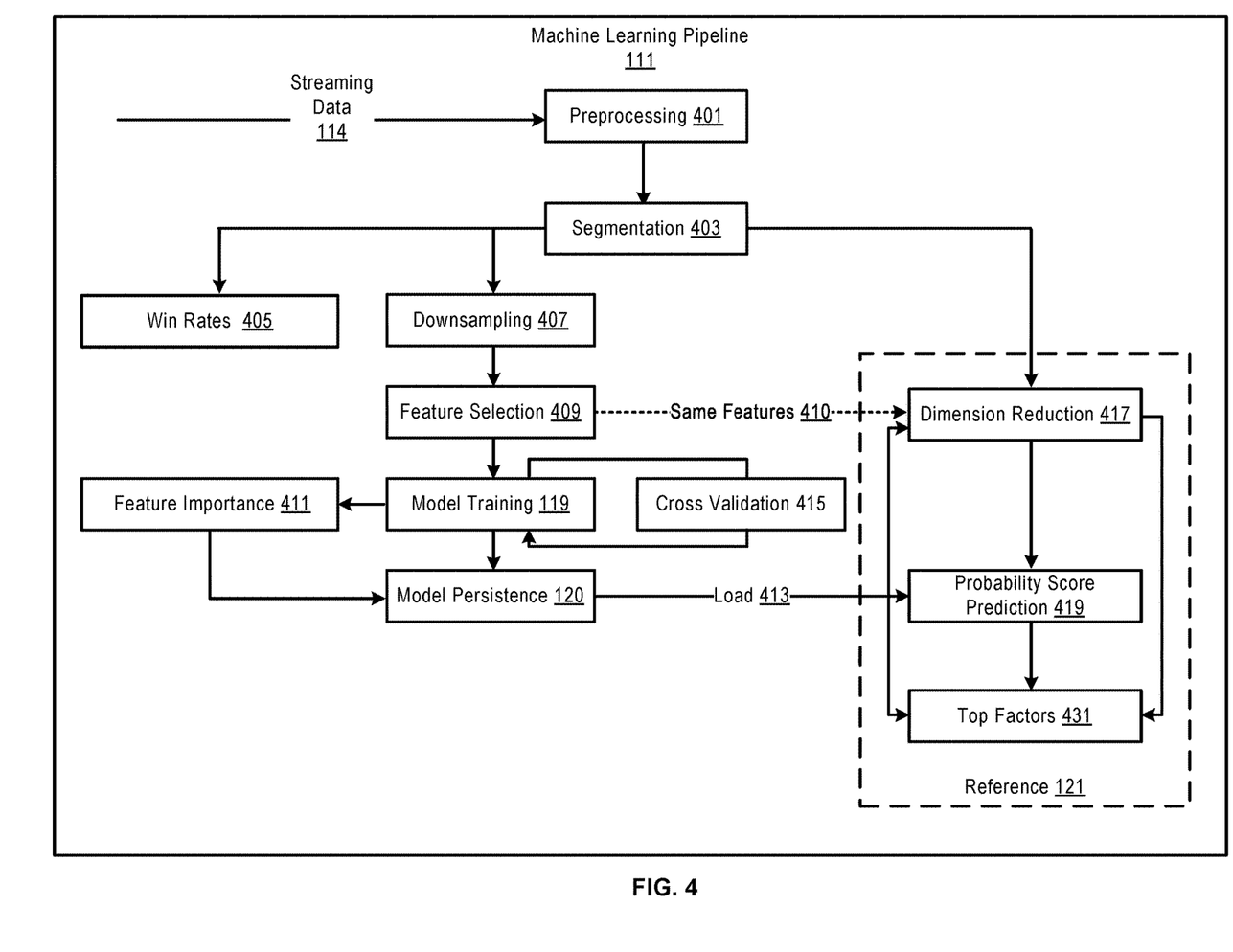
FIG. 4 illustrates an example ML pipeline in accordance with an embodiment.

FIG. 4 illustrates an example ML pipeline in accordance with an embodiment. As described, the ML pipeline 111 can be specified by an ML workflow, which can include a number of hyperparameters and parameters for each module of the ML pipeline 111. The hyperparameters can be saved into a database such as Mongo. Listing 1 below shows an example of the hyperparameters.

Listing 1

```
{
  "sfOrgId": "00Dd0000000hZKcEAM",
  "object": "OPPORTUNITY",
  "scoreType": " TIME_AGNOSIC_SCORE",
  "segmentId": 0,
  "pipeline": [
    {
      "id": "data retrieval",
      "params": { },
      "object_type": "TEST_DATA_RETRIEVAL_TRAINER"
    },
    {
      "id": "preprocessing",
      "params": {
        "sampling": "event based"
      },
      "object_type": "RF_PREPROCESSING_TRAINER"
    },
    {
      "id": "sampling",
      "params": {
        "downsampling_method":
"Downsampling.RANDOM_SELECTION_SAMPLING",
        "upsampling_method": " Upsampling.RANDOM_SELECTION_SAMPLING",
        "max_samples": 10000000
      },
      "object_type": "RF_SAMPLING_TRAINER"
    },
    {
      "id": "feature preparation",
      "params": {
        "categorical_feature_encoding_method":
          CategoricalFeatureEncoding.ONE_HOT_ENCODING",
        "numerical_feature_fill_missing_method": [ ]
      },
      "object_type": "RF_FEATURE_PREPARATION_TRAINER"
    },
    {
      "id": "feature selection",
      "params": {
        "max_features": 20
      },
      "object_type": "RF_FEATURE_SELECTION_TRAINER"
    },
    {
      "id": "LSTM",
      "params": {
      },
      "object_type": "LSTM_MODEL_TRAINER"
    }
  ]
}
```

In one embodiment, the workflow specified in Listing 1 allows a user to incorporate new modules and their corresponding parameters into the workflow via a user interface. The workflow also allows a user to add or delete existing modules from the workflow for each segment via the user interface.

In Listing 1, if the segment ID is not specified, the workflow can be used to train a ML model for an entire organization. With one or more additional modules, fields or methods, the workflow can specify whether an ML model is to be trained from scratch or incrementally. The workflow can be saved together with the ML model that has been trained using the workflow, as if incremental training has been specified. In one embodiment, all the parameters and configurations are saved as they are, such that the workflow can be used subsequently to incrementally train the ML model. However, if cross validation is used in the workflow, the option of incremental training would not be allowed.

Referring back to FIG. 4, a preprocessing module 401 in the ML pipeline 111 can receive training data 114 in a streaming fashion through a streaming API. In this module, the training data 114 is to be cleaned, and any task whose outcome is unknown or that has no associated historical data are removed. For labeled data, a value of "0" is given to a task that has been lost (i.e. a lost deal); a value of "100" is given to a task that has been successfully closed (i.e. a won deal); and an exception is thrown for a task having no historical data or having an unknown label.

In one embodiment, in the inference phase, the preprocessing module 401 may obtain the current status of the task to be scored, as a task to be scored may go through a number of stages in the same ML pipeline used in the training process.

The preprocessing module 401 can further sample all the training data to get snapshots in an event-based sampling; and fill in missing data, or leave blank fields as is when the blank fields are known to be properly handled by a trained ML model. In one embodiment, only when an event associated with a task (e.g., a sales opportunity happen), one sample (e.g., a snapshot of the current status for this task)

can be collected. Event-based sampling can help avoid getting repeated samples if no events happen for quite a long time, and can also capture all changes compared with using a fixed-interval sampling approach.

A segmentation module 403 in the ML pipeline 111 can segment the training data into different groups. The segmentation module 403 can support both manual segmentation and automatic segmentation. Manual segmentation allows users themselves to configure data segments. This approach leverages the users' domain knowledge for segmenting data. An example configuration for manual segmentation is illustrated below in Listing 2.

Listing 2

```
{
"_id": ObjectId("578d4cd97eb0852969db89f2"),
"sfOrgId": "00Dd0000000hZKcEAM",
"segmentId": 1,
  "definition": {
  "@class": "com.clarius.cards.core.filter.salesforce.ComparisonExpression",
  "key": "opportunity.amount",
  "operator": "LESS_THAN",
  "value": "100000.0",
  "quoteValues": false
  },
"name": "small deals < 100k",
"lastUpdateTime": NumberLong("1467233000944")
}
```

As described above, the configuration shown in Listing 2 can be surfaced to users via a user interface for the users to edit.

The segmentation module 403 also supports automatic segmentation when tasks show obvious clusters. When training those ML models that have segmentation as an inherent feature, automatic segmentation can be skipped by the segmentation module 403. In one embodiment, the segment Id for each task can be passed to the deep learning container 106, together with historical data from the data pipeline 109. Tasks with the same segmentation ID can be grouped together to train separate ML models.

A downsampling module 407 can downsample to balance the training data, to ensure that the training data does not have a disproportional number of lost tasks compared to the number of won tasks. The downsampling can be performed in only one pass using the classic reservoir sampling approach. Alternatively, the downsampling can be performed in two passes. In the first pass, a number of snapshots can be counted for both win tasks and lost tasks. In the second pass, the downsampling module 407 can obtain the largest value of a maximum threshold, the number of win tasks, and the number of the lost tasks.

A feature selection module 409 can reduce feature dimensions by one of a number of approaches, including removing features with low variance, principal component analysis (PCA) or incremental PCA, univariate feature selection, logistic regression with L1 regularization, and tree based feature selection.

The model training module 119, as described in FIG. 1, can be used to train different types of ML models, including Random Forest models, Xgboost models, long short-term memory (LSTM) models, and feedforward neural network models. The model training module 119 can implement a number of libraries/frameworks to train the different types of ML models.

For example, the model training module 110 can implement a Tensorflow framework which supports random forest and gradient boosting decision tree (GBDT) and handle data streaming; a Pyspark framework which handle data in a streaming fashion; an Xgboost framework which is an optimized distributed gradient boosting library; a Spark-sklearn framework that is a sklearn integration package for apache spark.

A cross validation module 415 can be used to tune the hyperparameters in the workflow. A model persistence 120 can be used to persist trained ML models into the data store 120 or a cache or a cloud storage service. The whole workflow as well as the valid start and end time for training an ML model can be persisted, together with the model itself.

A probability score prediction module 419 can use a trained ML model to generate a probability score (also referred to as a prediction score) in response to receiving a user request. A task in the request can go through a number of stages in the same pipeline as used in the training process, which includes the following steps: (1) determining its segment and loading 413 the corresponding segment model from the data store 122, a cache or a cloud storage service; (2) removing the less important features that are removed from the training phase; and (3) running the corresponding ML model to obtain the prediction score. As shown in FIG. 4, a dimension reduction module 417 can be used to select the same features 410 used to train the ML model.

A top factors module 431 can generate a number of factors that can be surfaced to a user. The factors can explain to a user why a task can be closed or not. In one embodiment, one or more user-level filters can be set so that explanations related to some field are not surfaced to the user, but only surfaced to the user's supervisors.

The ML pipeline 111 also include a win rates module 405 that collect analytics for conversion rates from a particular stage of a task to another stage of the task. The win rates module 405 can collect the analytics during the training phrase using APIs on the fly for one or more specified fields. The analytics may provide some insight into the ML model as to why a particular field is a negative or positive factor in calculating the probability score; and such information typically is not available from the ML model, which appears to be a black box to users.

A feature importance module 411 may be used to collected information indicating global importance of each feature used for training the ML models for certain types of ML models, for example, Random forest and Xgboost. The information can be saved together with profiling and monitoring information into a database, such as MongoDB.

In one embodiment, the ML pipeline can be used to generate a number of types of prediction scores, including time-agnostic scores, scores by end of time period (ETP), and scores by a close date. A time-agnostic score, which is not tied to any specific time, measures the probability that a task can be closed as a won deal without considering the close date. A score by ETP measures the probability that a task can be closed by the end of a particular period (e.g., a quarter or a year). A score by a close date measures the probability that a task can be close by a specified close date. Depending on the type of score that the ML pipeline is configured to generate, different set of features can be used to train an ML model.

Figure 5:
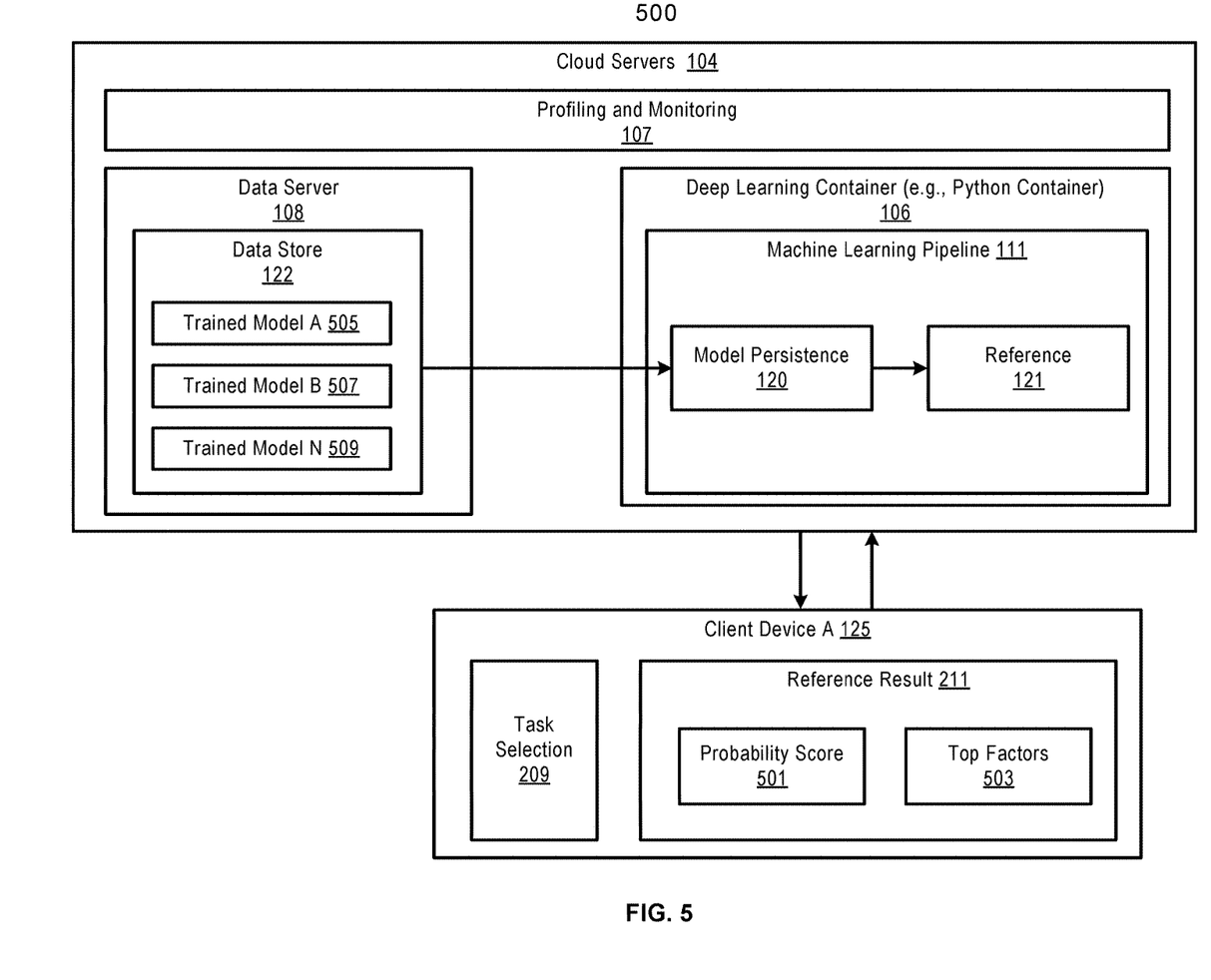
FIG. 5 is a block diagram illustrating an example system for generating scores to predict probabilities of task completion in accordance with an embodiment.

FIG. 5 is a block diagram illustrating an example system 500 of training a machine learning model for predicting probabilities of task completion in accordance with an embodiment. As shown in FIG. 5, a number of trained ML models 505, 507 and 509. The ML models are of different types. However, they may be trained using the same ML pipeline specified by the same workflow. The model persistence module 120 may periodically validate each ML model based on updated data (e.g., last two weeks) to select the model with the best prediction result.

When a user requests a selected task to be scored via the task selection user interface 209, the selected ML model can be triggered to generate a probability score 501 and a number of factors 503 that best explain the probability score 501.

Figure 6:
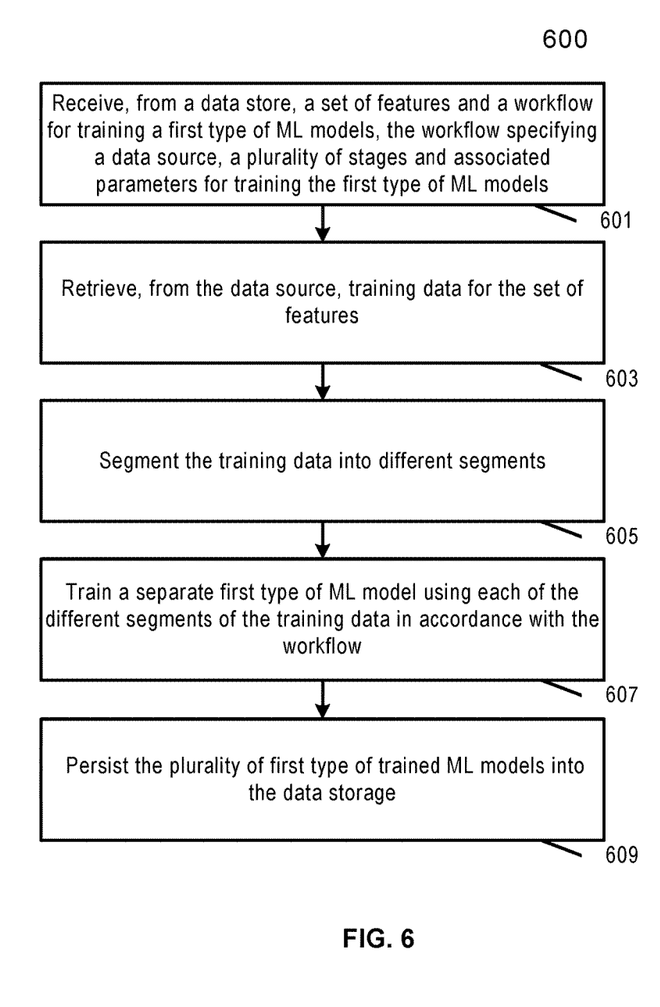
FIG. 6 illustrates a process for training a machine learning model for predicting probabilities of task completion in accordance with an embodiment.

FIG. 6 illustrates a process 600 for training a machine learning model for predicting probabilities of task completion in accordance with an embodiment. Process 600 may be performed by processing logic which may include software, hardware, or a combination thereof.

Referring back to FIG. 6, in operation 601, the processing logic receives, from a data store, a set of features and a workflow for training a first type of ML models, the workflow specifying a data source, a plurality of stages and associated parameters for training the first type of ML models. In operation 603, the processing logic retrieves from the data source training data for the set of features. In operation 605, the processing logic segments the training data into different segments. In operation 607, the processing logic trains a separate first type of ML model using each of the different segments of the training data in accordance with the workflow. In operation 609, the processing logic persists the plurality of first type of trained ML models into the data storage.

Figure 7:
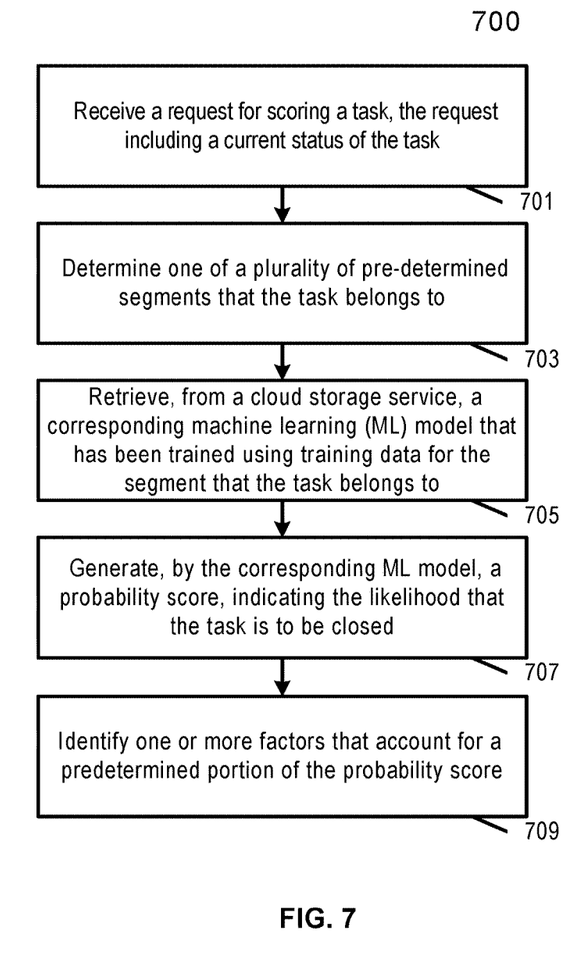
FIG. 7 illustrates a process for generating scores to predict probabilities of task completion in accordance with an embodiment.

FIG. 7 illustrates a process for generating scores to predict probabilities of task completion in accordance with an embodiment. Process 700 may be performed by processing logic which may include software, hardware, or a combination thereof.

Referring back to FIG. 7, in operation 701, the processing logic receives a request for scoring a task, the request including a current status of the task. In operation 703, the processing logic determines one of a plurality of predetermined segments that the task belongs to. In operation 705, the processing logic retrieves from a data storage, a corresponding ML model that has been trained using the training data for the segment that the task belongs to. In operation 707, the processing logic invokes the corresponding ML model to generate a probability score which indicates the likelihood that the task to be closed. In operation 709, the processing logic identifies one or more factors that accounts for a predetermined portion of the probability score. For example, in order to be selected as a factor (e.g., a feature for training the ML model), that factor must account for at least 10% of the probability score.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
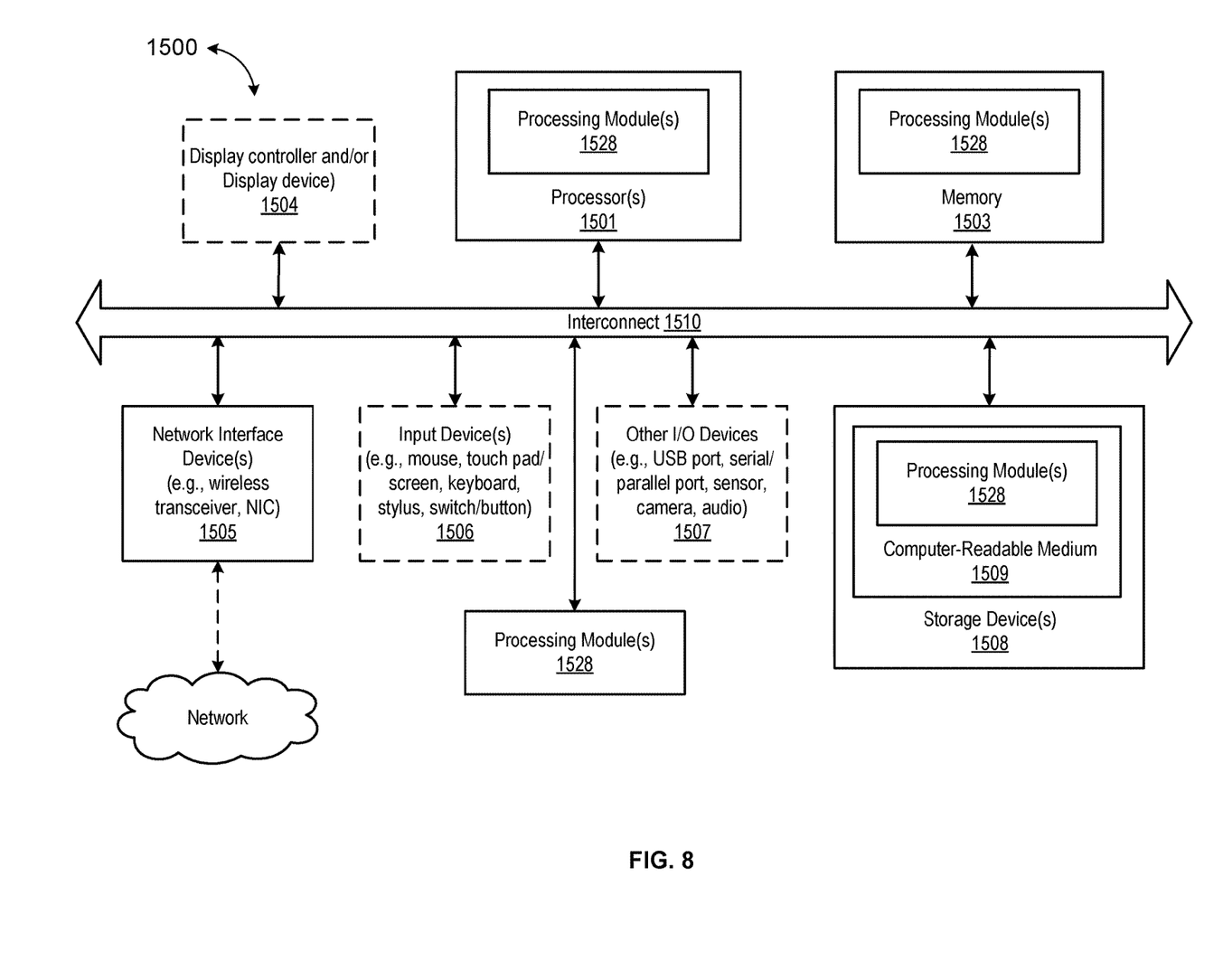
FIG. 8 is a block diagram illustrating an example of a data processing system which may be used with one embodiment of the disclosure.

FIG. 8 is a block diagram illustrating an example of a data processing system which may be used with one embodiment of the disclosure. For example, system 1500 may represent any of data processing systems described above performing any of the processes or methods described above. System 1500 can include many different components. These components may be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor may be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment may be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications may be loaded in memory 1503 and executed by processor 1501. An operating system may be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein may be implemented as discrete hardware components or integrated in the functionality of hardware components such as ASICS, FPGAs, DSPs or similar devices. In addition, processing module/unit/logic 1528 may be implemented as firmware or functional circuitry within hardware devices. Further, processing module/unit/logic 1528 may be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of generating scores to predict probabilities of task completion, comprising:
  receiving a request for scoring a task, the request including a current status of the task;
  determining a segment of a plurality of pre-determined segments of training data that the task belongs to;
  retrieving, from a cloud storage service, a corresponding machine learning (ML) model for the segment that the task belongs to;
  determining, from a configuration data structure stored in a cloud storage service, a first set of features used to train the ML model;
  providing the first set of features and the current status in the request to the ML model;
  generating, by the corresponding ML model based on the first set of features and the current status of the task, a probability score indicating a likelihood that the task is to be closed;
  identifying, from the first set of features, one or more features that each accounts for a predetermined portion of the probability score, wherein the identifying of the one or more features comprises:
    executing the corresponding ML model for a plurality of iterations,
    for each iteration, removing a different feature from the first set of features;
    generating, by the corresponding ML model, a new probability based on the remaining features of the first set of features, and
    identifying the removed feature as one of the one or more features when a change from the probability score to the new probability score exceeds a predetermined percentage; and
  sending the probability score and the one or more identified features to a graphical user interface for display.

2. The method of claim 1, further comprising:
  determining that the configuration data structure has been modified, and that the configuration data structure includes a second set of features, wherein the second set of features is larger than the first set of features used to train the ML model; and
  reducing the second set of features to the first set of features by removing one or more features from the second set of features.

3. The method of claim 1, wherein the cloud storage service stores a trained ML model for each of the plurality of predetermined segments of training data.

4. The method of claim 1, wherein the segment is one of a plurality of segments, where each of the plurality of segments represents a group of tasks that share one or more features.

5. The method of claim 1, wherein the first set of features includes at least one derived feature, which is a feature that is derived from another feature.

6. The method of claim 1, wherein the a corresponding ML model is stored in one or more JSON documents in the cloud storage service.

7. A non-transitory computer readable medium storing program instructions for generating scores to predict probabilities of task completion, wherein the program instructions, when executed by a processor, cause the processor to perform operations comprising:

receiving a request for scoring a task, the request including a current status of the task;

determining a segment of a plurality of pre-determined segments of training data that the task belongs to;

retrieving, from a cloud storage service, a corresponding machine learning (ML) model for the segment that the task belongs to;

determining, from a configuration data structure stored in a cloud storage service, a first set of features used to train the ML model;

providing the first set of features and the current status in the request to the ML model;

generating, by the corresponding ML model based on the first set of features and the current status of the task, a probability score indicating a likelihood that the task is to be closed;

identifying, from the first set of features, one or more features that each accounts for a predetermined portion of the probability score, wherein the identifying of the one or more features comprises:

executing the corresponding ML model for a plurality of iterations, for each iteration, removing a different feature from the first set of features;

generating, by the corresponding ML model, a new probability based on the remaining features of the first set of features, and identifying the removed feature as one of the one or more features when a change from the probability score to the new probability score exceeds a predetermined percentage; and sending the probability score and the one or more identified features to a graphical user interface for display.

8. The non-transitory computer readable medium of claim 7, wherein the program instructions further comprise:

determining that the configuration data structure has been modified, and that the configuration data structure includes a second set of features, wherein the second set of features is larger than the first set of features used to train the ML model; and reducing the second set of features to the first set of features by removing one or more features from the second set of features.

9. The non-transitory computer readable medium of claim 7, wherein the cloud storage service stores a trained ML model for each of the plurality of predetermined segments of training data.

10. The non-transitory computer readable medium of claim 7, wherein the segment is one of a plurality of segments, where each of the plurality of segments represents a group of tasks that share one or more features.

11. The non-transitory computer readable medium of claim 7, wherein the first set of features includes at least one derived feature, which is a feature that is derived from another feature.

12. The non-transitory computer readable medium of claim 7, wherein the a corresponding ML model is stored in one or more JSON documents in the cloud storage service.

13. A data processing system, comprising:
a processor;
a memory coupled to the processor and storing program instructions for generating scores to predict probabilities of task completion, wherein the program instructions, when executed by the processor, cause the data processing system to perform operations comprising:

receiving a request for scoring a task, the request including a current status of the task;

determining a segment of a plurality of pre-determined segments of training data that the task belongs to;

retrieving, from a cloud storage service, a corresponding machine learning (ML) model for the segment that the task belongs to;

determining, from a configuration data structure stored in a cloud storage service, a first set of features used to train the ML model;

providing the first set of features and the current status in the request to the ML model;

generating, by the corresponding ML model based on the first set of features and the current status of the task, a probability score indicating a likelihood that the task is to be closed;

identifying, from the first set of features, one or more features that each accounts for a predetermined portion of the probability score, wherein the identifying of the one or more features comprises:

executing the corresponding ML model for a plurality of iterations, for each iteration, removing a different feature from the first set of features;

generating, by the corresponding ML model, a new probability based on the remaining features of the first set of features, and identifying the removed feature as one of the one or more features when a change from the probability score to the new probability score exceeds a predetermined percentage; and sending the probability score and the one or more identified features to a graphical user interface for display.

14. The data processing system of claim 13, wherein the program instructions further comprise:

determining that the configuration data structure has been modified, and that the configuration data structure includes a second set of features, wherein the second set of features is larger than the first set of features used to train the ML model; and reducing the second set of features to the first set of features by removing one or more features from the second set of features.

15. The data processing system of claim 13, wherein the cloud storage service stores a trained ML model for each of the plurality of predetermined segments of training data.

16. The system of claim 13, wherein the segment is one of a plurality of segments, where each of the plurality of segments represents a group of tasks that share one or more features.

17. The system of claim 13, wherein the first set of features includes at least one derived feature, which is a feature that is derived from another feature.

18. The system of claim 13, wherein the a corresponding ML model is stored in one or more JSON documents in the cloud storage service.

* * * * *